United States Patent

Berrie et al.

[15] 3,664,996
[45] May 23, 1972

[54] MONO AZO DYESTUFFS CONTAINING A PYRIDYL GROUP

[72] Inventors: Alistair Howard Berrie; Nigel Hughes, both of Manchester, England

[73] Assignee: Imperial Chemical Industries Limited, London, England

[22] Filed: June 23, 1969

[21] Appl. No.: 835,749

[30] Foreign Application Priority Data

June 27, 1968 Great Britain......................30,760/68

[52] U.S. Cl. ..................260/156, 260/247.2 A, 260/293.69, 260/294.9, 260/295.5 A, 260/295.5 R, 260/296 R
[51] Int. Cl. ..........................................................C09b 29/36
[58] Field of Search..................................................260/156

[56] References Cited

UNITED STATES PATENTS 3,487,066   12/1969   Ritter et al...........................260/156

Primary Examiner—Joseph Rebold
Assistant Examiner—Donald M. Papuga
Attorney—Cushman, Darby & Cushman

[57] ABSTRACT

Water-insoluble monoazo dyestuffs of the formula:

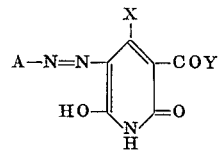

wherein A is optionally substituted aryl, X is hydrogen, optionally substituted aryl or alkyl optionally substituted by hydroxy, alkoxy or acyloxy, and Y is $-R$, $-OR$ or $-NR^1R^2$, R being optionally substituted alkyl or aryl, and $R^1$ and $R^2$ each independently being hydrogen or optionally substituted alkyl or aryl, and the use of the dyestuffs for colouring synthetic polyester textile materials.

2 Claims, No Drawings

MONO AZO DYESTUFFS CONTAINING A PYRIDYL GROUP

This invention relates to water-insoluble monoazo dyestuffs which are valuable for coloring synthetic textile materials, in particular aromatic polyester textile materials.

According to the invention there are provided the water-insoluble monoazo dyestuffs which, in one of the possible tautomeric forms, are represented by the formula:

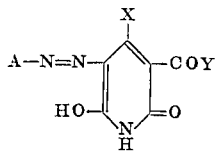

wherein A is an optionally substituted aryl radical, Y is a -R, -OR or -$NR^1R^2$ radical, R is an optionally substituted alkyl or aryl radical, $R^1$ and $R^2$ each independently represent a hydrogen atom or an optionally substituted alkyl or aryl radical, or $R^1$ and $R^2$ together form with the nitrogen atom N a five- or six-membered nitrogen containing heterocyclic ring, and X is a hydrogen atom, or an alkyl radical which is optionally substituted by a hydroxy, alkoxy or acyloxy group, or an optionally substituted aryl radical, provided that the dyestuffs are free from carboxylic acid and sulphonic acid groups.

The dyestuffs of the invention can exist in a number of possible tautomeric forms. For convenience the dyestuffs have been formulated in one of these forms, but it is to be understood that the specification relates to the dyestuffs in any of the possible tautomeric forms.

As examples of the optionally substituted aryl radicals represented by A there may be mentioned optionally substituted naphthyl radicals and preferably optionally substituted phenyl radicals, in particular phenyl radicals substituted by one or more of the same or different substituents such as chlorine, bromine, nitro, cyano, lower alkyl such as methyl, lower alkoxy such as methoxy, trifluoromethyl, lower alkyl sulphonyl, lower alkyl carbonyl, carbo lower alkoxy such as carboethoxy and hydroxy and lower alkoxy derivatives thereof such as carbo-β-hydroxyethoxy, carbo-β-methoxyethoxy and carbo-β-(β'-ethoxy ethoxy)ethoxy, sulphonamido and N-lower alkyl and N:N-di(lower alkyl)derivatives thereof, sulphonanilido, carbonamido and N-lower alkyl and N:N-di(lower alkyl)derivatives thereof, sulphamato (-$OSO_2NH_2$) and N-lower alkyl and N:N-di(lower alkyl) derivatives thereof, phenyl, N:N-di(lower alkyl) amino and phthalyl (which combines to form an anthraquinone nucleus).

Throughout this Specification the terms "lower alkyl" and "lower alkoxy" are used to denote alkyl and alkoxy radicals respectively containing from one to four carbon atoms.

The optionally substituted alkyl radicals represented by R, $R^1$ and $R^2$ are preferably optionally substituted lower alkyl radicals; and as examples of the said radicals there may be mentioned lower alkyl such as methyl, ethyl, propyl and butyl, hydroxy lower alkyl such as β-hydroxyethyl, aryl lower alkyl such as benzyl and β-phenylethyl, and lower alkoxy lower alkyl such as β-(methoxy or ethoxy) ethyl. The optionally substituted aryl radicals represented by R, $R^1$, $R^2$ and X are preferably optionally substituted phenyl radicals; such as phenyl itself and tolyl, anisyl, chlorophenyl, bromophenyl and dimethylphenyl.

The alkyl radicals represented by X which are optionally substituted by hydroxy, alkoxy or acyloxy groups are preferably lower alkyl radicals which may be substituted by the said groups; and as specific examples of such radicals represented by X there may be mentioned lower alkyl such as methyl, ethyl, propyl and butyl, hydroxy lower alkyl such as β-hydroxyethyl and β- or γ- hydroxypropyl, lower alkoxy lower alkyl such as β-(methoxy or ethoxy)ethyl and β- or γ-(methoxy or ethoxy)propyl, and acyloxy lower alkyl in particular lower alkylcarbonyloxy lower alkyl such as β-acetoxyethyl, β-propionyloxyethyl and acetoxymethyl.

As examples of the five- and six-membered nitrogen-containing heterocyclic rings formed by joining $R^1$, $R^2$ and the nitrogen atom together there may be mentioned morpholino, piperidino and pyrrolidino.

According to a further feature of the invention there is provided a process for the manufacture of the monoazo dyestuffs of the invention which comprises coupling a diazo compound of an amine of the formula A-$NH_2$ with a coupling component of the formula:

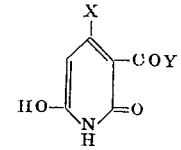

Formula I wherein A, X and Y have the meanings stated above, the amine and the coupling component being free from carboxylic acid and sulphonic acid groups.

The process of the invention can be conveniently carried out by adding the diazo compound, which is generally in the form of a solution or suspension in an aqueous acidic medium, to a solution or suspension of the coupling component in water and/ or a water-miscible organic liquid optionally containing an inorganic acid or an alkali metal hydroxide or carbonate, if necessary adjusting the pH of the mixture to effect coupling, and thereafter isolating the dyestuff by conventional methods.

As examples of the amines of the formula A-$NH_2$ there may be mentioned aniline, o-, m- or p-toluidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6-di(chloro- or bromo-)-4-nitroaniline, 2:4:6-tri-nitroaniline, 2:4-dinitro-6-carbomethoxyaniline, 2-amino-5-nitrobenzotrifluoride, 2:4-bis(methanesulphonyl)aniline, 2-(chloro- or bromo-)-4-nitroaniline, methylanthranilate, 4- or 5-nitromethylanthranilate, β-hydroxyethyl 4-aminobenzoate, β-methoxyethyl 4-aminobenzoate, 4-aminobenzamide, 2:6-di (chloro- or bromo-)-aniline-4-sulphonamide, 2:6-di(chloro- or bromo-)-4-methyl-sulphonylaniline, 2:5-di(chloro- or bromo-)-4:6-dinitroaniline, 2-amino-3:5-dinitrobenzotrifluoride, 3-amino-2-(chloro- or bromo-)-4:6 -dinitro-(toluene or anisole), 3-amino-4-(chloro- or bromo-)-2:6-dinitro-(toluene or anisole), 2- or 4-cyano-aniline, 4-nitro-2-cyanoaniline, 2:4-dinitro-6-cyanoaniline, 2-nitro-4-cyanoaniline, 2-chloro-4-cyanoaniline, 3-amino-2:4:6-trinitrotoluene, 2-(chloro- or bromo-)-4-methylsulphonylaniline, 3-(chloro- or bromo-)-4-thiocyanatoaniline, 2-(chloro- or bromo-)-4-sulphamylaniline, 2-amino-5-nitrophenylmethanesulphone, 2-amino-3:5-dinitrophenylmethylsulphone, 2-amino-3-(chloro- or bromo-)-5-nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4:6-dinitroaniline, 2-methylsulphamyl-4-nitro-6-(chloro- or bromo-)aniline, 2-phenylsulphamyl-4-nitroaniline, methyl 2-amino-3-(chloro- or bromo-)-5-nitro-benzoate, dimethyl 2-aminoterephthalate, dimethyl 2-amino-6-nitroterephthalate, aniline 2-, 3- or 4-sulphamate, 2-, 3- or 4-aminobenzene N:N-dimethylsulphamate, 1-naphthylamine, 1- or 2-aminoanthraquinone and 4-aminodiphenyl.

The coupling components of Formula I can themselves be obtained by a variety of methods such as are described in, for example, "Heterocyclic Compounds — Pyridine and its Derivatives — Part 3" edited by Klingsberg, which was published by Interscience Publishers in 1962. For example by cyclization of amide, ester or nitrile derivatives of the appropriately α:β-disubstituted glutaconic acid.

As specific examples of the said coupling components there may be mentioned 2:6-dihydroxy-3-carbonamido-4-methyl pyridine, 2:6-dihydroxy-3-carbethoxy-4-methyl pyridine, 2:6-dihydroxy-3-carbondiethylamido-4-methyl pyridine, 2:6-dihydroxy-3-carbonamido pyridine, 2:6-dihydroxy-3-carbonamido-4-phenyl pyridine and 2:6-dihydroxy-3-carbethoxy-4-phenyl pyridine.

One preferred class of the monoazo dyestuffs of the invention comprises the dyestuffs wherein A is an optionally substituted phenyl radical.

A second preferred class of the monoazo dyestuffs of the invention comprises the monoazo dyestuffs of the formula:

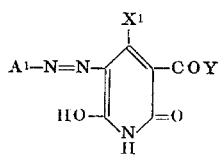

wherein $A^1$ is an optionally substituted phenyl radical, $X^1$ is a lower alkyl radical and Y has the meaning stated. In particular the group -COY represents a carbo lower alkoxy or carbonamido radical.

The water-insoluble monoazo dyestuffs of the invention are valuable for coloring synthetic textile materials, in particular cellulose acetate and cellulose triacetate textile materials, polyamide textile materials such as polyhexamethylene-adipamide textile materials, and preferably aromatic polyester textile materials such as polyethylene terephthalate textile materials. Such textile materials can be in the form of thread, yarn, or woven or knitted fabric.

Such textile materials can conveniently be colored with the monoazo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C. preferably in the presence of a carrier such as diphenyl or o-hydroxydiphenyl, or at a temperature above 100° C., preferably at a temperature between 120° and 130° C., under superatmospheric pressure.

Alternatively the aqueous dispersion of the said monoazo dyestuff can be applied to the textile material by a padding or printing process, followed by heating or steaming of the textile material. In such processes it is preferred to incorporate a thickening agent, such as gum tragacanth, gum arabic, or sodium alginate, into the aqueous dispersion of the said monoazo dyestuff.

At the conclusion of the coloring process it is preferred to give the colored textile material a rinse in water or a brief soaping treatment before finally drying the colored textile material. In the case of aromatic polyester textile materials it is also preferred to subject the colored textile material to a treatment in an alkaline aqueous solution of sodium hydrosulphite before the soaping treatment in order to remove loosely attached dyestuff from the surface of the textile material.

The monoazo dyestuffs have excellent affinity and building up properties on synthetic textile materials, and in particular on aromatic polyester textile materials, so enabling heavy depths of shade to be obtained. The resulting colorations which range in shade from yellow to violet, have excellent fastness to light, to wet treatments, and, in particular, to dry heat treatments such as those carried out at high temperatures during pleating operations.

If desired the dyestuffs of the invention can be applied to synthetic textile materials in conjunction with other disperse dyes, such as are described in, for example, British Pat. specifications Nos. 806271, 835819, 840903, 847175, 852493, 859899, 865328, 872204, 894012, 908656, 909843, 910306, 913856, 919424, 944513, 944722, 953887, 959816, 960235 and 961412.

The invention is illustrated but not limited by the following examples in which the parts are by weight.

Example 1

5 Parts of a 14 percent aqueous solution of sodium nitrate are added to a solution of 2.16 parts of 3-aminobenzene N:N-dimethyl sulphamate in a mixture of 50 parts of water and 2.5 parts of a concentrated aqueous solution of hydrochloric acid, and the mixture is stirred for a further 15 minutes at the same temperature.

The resulting solution of the diazo compound is gradually added with stirring to a solution of 1.7 parts of 2:6-dihydroxy-3-carbonamido-4-methylpyridine and 5 parts of sodium acetate in 110 parts of a 0.8 percent aqueous solution of sodium hydroxide at 0° – 5° C., and the mixture is stirred for a further 15 minutes. The mixture is acidified with acetic acid, and the precipitated dyestuff is filtered off, washed with water and dried.

When dispersed in aqueous medium the so-obtained dyestuff dyes aromatic polyester textile materials in deep greenish-yellow shades of excellent fastness properties.

The 2:6-dihydroxy-3-carbonamido-4-methylpyridine used in the above example was itself obtained by condensing malonodiamide with ethyl acetoacetate in the presence of sodium ethoxide.

The following table gives further examples of the monoazo dyestuffs of the invention which are obtained by diazotizing the amines listed in the second column of the table and coupling the resulting diazo compounds with the coupling components listed in the third column of the table using methods similar to that described in Example 1. The fourth column of the table indicates the shades obtained when the dyestuffs are applied to aromatic polyester textile materials.

The 2:6-dihydroxy-3-carboethoxy-4-methylpyridine was obtained by reacting acetoacetamide with diethylmalonate in

| Example | Amine | Coupling component | Shade |
|---|---|---|---|
| 2 | 2-chloroaniline | 2,6-dihydroxy-3-carboethoxy-4-methylpyridine | Greenish yellow. |
| 3 | 4-chloroaniline | do | Do. |
| 4 | 2-nitroaniline | do | Do. |
| 5 | 3-nitroaniline | do | Do. |
| 6 | 4-nitroaniline | do | Do. |
| 7 | 2-anisidine | do | Reddish yellow. |
| 8 | 4-toluidine | do | Yellow. |
| 9 | Ethyl 4-aminobenzoate | do | Greenish yellow. |
| 10 | β-Methoxyethyl 3-aminobenzoate | do | Do. |
| 11 | 1-naphthylamine | do | Yellow. |
| 12 | 1-aminoanthraquinone | do | Do. |
| 13 | 4-aminodiphenyl | do | Do. |
| 14 | Aniline | do | Greenish yellow. |
| 15 | 4-methyl-2-nitroaniline | do | Reddish yellow. |
| 16 | 4-methoxy-2-nitroaniline | do | Orange. |
| 17 | 4-cyanoaniline | do | Greenish yellow. |
| 18 | 2-chloro-4-nitroaniline | do | Do. |
| 19 | 4-chloro-2-nitroaniline | do | Do. |

| Example | Amine | Coupling component | Shade |
|---|---|---|---|
| 20 | 4-chloroaniline | 2,6-dihydroxy-3-(carbo-β-ethoxyethoxy)-4-methylpyridine | Do. |
| 21 | 2-nitroaniline | do | Do. |
| 22 | Ethyl 4-aminobenzoate | do | Do. |
| 23 | 4-methoxy-2-nitroaniline | do | Do. |
| 24 | 2-nitroaniline | 2,6-dihydroxy-3-N-ethylcarbonamido-4-methylpyridine | Orange. |
| 25 | Ethyl 4-aminobenzoate | do | Greenish yellow. |
| 26 | do | 2,6-dihydroxy-3-N,N-diethylcarbonamido-4-methylpyridine | Do. |
| 27 | 2-nitroaniline | do | Do. |
| 28 | do | 2,6-dihydroxy-3-N-phenylcarbonamido-4-methylpyridine | Do. |
| 29 | Ethyl 4-aminobenzoate | do | Do. |
| 30 | 4-methoxy-2-nitroaniline | do | Do. |
| 31 | 4-methyl-2-nitroaniline | 2,6-dihydroxy-3-[N-(p-methoxyphenyl)carbonamido]-4-methylpyridine | Do. |
| 32 | 4-chloroaniline | do | Orange. |
| 33 | 2-nitroaniline | do | Reddish yellow. |
| 34 | 4-diethylaminoaniline | 2,6-dihydroxy-3-(N-piperidin-1'-ylcarbonamido)-4-methylpyridine | Greenish yellow. |
| 35 | 4-chloroaniline | do | Do. |
| 36 | do | 2,6-dihydroxy-3-acetyl-4-methylpyridine | Violet. |
| 37 | do | 2,6-dihydroxy-3-benzoyl-4-methylpyridine | Greenish yellow. |
| 38 | do | 2,6-dihydroxy-3-(p-methoxybenzoyl)-4-methylpyridine | Do. |
| 39 | 2-nitroaniline | 2,6-dihydroxy-3-carboethoxypyridine | Do. |
| 40 | Ethyl 4-aminobenzoate | do | Do. |
| 41 | 4-methoxy-2-nitroaniline | do | Do. |
| 42 | 4-chloroaniline | 2,6-dihydroxy-3-carboethoxy-4-hydroxymethylpyridine | Orange. |
| 43 | 2-nitroaniline | do | Greenish yellow. |
| 44 | do | 2,6-dihydroxy-3-carboethoxy-4-methoxymethylpyridine | Do. |
| 45 | 4-chloroaniline | do | Do. |
| 46 | 4-methoxy-2-nitroaniline | do | Do. |
| 47 | 1-naphthylamine | 2,6-dihydroxy-3-carboethoxy-4-acetoxymethylpyridine | Orange. |
| 48 | 1-aminoanthraquinone | do | Reddish yellow. |
| 49 | 4-methoxy-2-nitroaniline | 2,6-dihydroxy-3-carboethoxy-4-phenylpyridine | Do. |
| 50 | 2-nitroaniline | do | Orange. |
| 51 | Ethyl 4-aminobenzoate | do | Greenish yellow. |
| 52 | 2,4-dichloroaniline | do | Do. |
| 53 | 2,4,5-trichloroaniline | do | Do. |
| 54 | 2-nitroaniline | 2,6-dihydroxy-3-carboethoxy-4-(p-chlorophenyl)pyridine | Do. |
| 55 | Ethyl 4-aminobenzoate | do | Do. |
| 56 | 4-methyl-2-nitroaniline | do | Do. |
| 57 | 4-trifluoromethylaniline | 2,6-dihydroxy-3-carboethoxy-4-methylpyridine | Reddish yellow. |
| 58 | 4-bromoaniline | do | Greenish yellow. |
| 59 | 4-acetylaminoaniline | do | Do. |
| 60 | 3-methylsulphonylaniline | do | Do. |
| 61 | 4-acetylaniline | do | Do. |
| 62 | Aniline-4-sulphonamide | 2,6-dihydroxy-3-(carbo-β-ethoxyethoxy)-4-methylpyridine | Do. |
| 63 | Aniline-4-sulphon-N-ethylamide | do | Do. |
| 64 | Aniline-4-sulphon-N,N-diethylamide | do | Do. |
| 65 | 4-aminobenzamide | do | Do. |
| 66 | 4-aminobenzanilide | do | Do. |
| 67 | 3-aminobenz-N-ethylamide | do | Do. |
| 68 | 4-acetylaminoaniline | 2,6-dihydroxy-3-(carbo-β-hydroxyethoxy)-4-methylpyridine | Do. |
| 69 | 4-methoxy-2-nitroanilie | do | Do. |
| 70 | 4-chloroaniline | 2,6-dihydroxy-3-carbophenoxy-4-methylpyridine | Orange. |
| 71 | 2-nitroaniline | do | Yellow. |
| 72 | do | 2,6-dihydroxy-3-carbo-p-chlorophenoxy-4-methylpyridine | Greenish yellow. |
| 73 | Ethyl 4-aminobenzoate | do | Do. | the presence of sodium ethoxide. On transesterification with β-ethoxyethanol this gave 2:6-dihydroxy-3-(carbo-β-ethoxyethoxy)-4-methylpyridine. On treatment with ethylamine, diethylamine, aniline, p-anisidine or piperidine, the 2:6-dihydroxy-3-carboethoxy-4-methylpyridine gave the corresponding 3-carbonamido compounds.

2:6-Dihydroxy-3-(acetyl or benzoyl)-4-methylpyridines were obtained by reacting 2:6-dihydroxy-4-methylpyridine with acetyl chloride or benzoyl chloride in the presence of aluminium chloride.

2:6-Dihydroxy-3-carboethoxy-4-(hydroxymethyl or methoxymethyl)pyridine were obtained by condensing 4-(hydroxy or methoxy)-3-oxobutanoic acid with diethylmalonate in the presence of sodium ethoxide.

2:6-Dihydroxy-3-carboethoxy-4-acetoxymethylpyridine was obtained by acetylating the corresponding 4-hydroxymethyl compound.

2:6-Dihydroxy-3-carboethoxy-4-(phenyl or p-chlorophenyl)pyridine were obtained by condensing benzoylacetamide or the corresponding p-chloro derivative with diethylmalonate in the presence of sodium ethoxide.

2:6-Dihydroxy-3-(carbo-β-hydroxyethoxy, carbophenoxy and carbo-p-chlorophenoxy)-4-methylpyridine were obtained by trans-esterification of 2:6-dihydroxy-3-carboethoxy-4-methylpyridine with ethylene glycol, phenol and p-chlorophenol respectively.

We claim:
1. Water-insoluble monoazo dyestuff free from sulphonic acid and carboxylic acid groups having the general formula

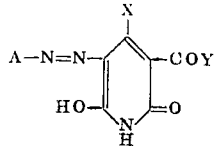

wherein A is selected from the group consisting of phenyl, naphthyl and phenyl substituted with a member selected from the group consisting of chlorine, bromine, nitro, cyano, lower alkyl, lower alkoxy, acetylamino, trifluoromethyl, lower alkylsulphonyl, lower alkylcarbonyl, carbo lower alkoxy, carbo lower alkoxy lower alkoxy, carbo hydroxy lower alkoxy, sulphonamido, N-lower alkyl sulphonamido, N:N-di (lower alkyl) sulphonamido, N-phenylsulphonamido, N-carbonamido, N-lower alkylcarbonamido, N:N-di (lower alkyl) carbonamido, sulphamato, N-lower alkylsulphamato, N:N-di (lower alkyl) sulphamato, phenyl, N:N-di (lower alkyl) amino and phthalyl, X is selected from the group consisting of hydrogen, lower alkyl, hydroxy lower alkyl, lower alkoxy lower alkyl and lower alkyl carbonyloxy lower alkyl and Y is selected from the group consisting of -R, -OR and -NR¹R² wherein R is selected from the group consisting of lower alkyl, lower alkoxy lower alkyl, hydroxy lower alkyl, phenyl, chlorophenyl and methoxyphenyl and R¹ and R² each independently are selected from the group consisting of hydrogen, lower alkyl, phenyl and methoxy phenyl and R¹ and R² together with the nitrogen atom to which they are attached form the piperidine ring.

2. The water-insoluble monoazo dyestuff of claim 1 having the formula

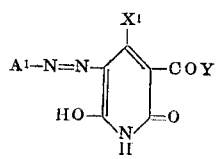

wherein A has the meaning given in claim 4, X¹ is lower alkyl and -COY is selected from the group consisting of carbo lower alkoxy and carbonamido.

* * * * *